US012661876B2

(12) United States Patent
Lee et al.

(10) Patent No.: US 12,661,876 B2
(45) Date of Patent: Jun. 23, 2026

(54) BARRIER LAMINATES INCLUDING ETHYLENE COPOLYMER EXTRUDED WEB LAYERS

(71) Applicant: Dow Global Technologies LLC, Midland, MI (US)

(72) Inventors: Edward L. Lee, Singapore (SG); Hwee Tatz Thai, Singapore (SG); Wu Aik Yee, Singapore (SG); Hwee Lun Goh, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 137 days.

(21) Appl. No.: 18/252,577

(22) PCT Filed: Jan. 13, 2022

(86) PCT No.: PCT/US2022/012217
§ 371 (c)(1),
(2) Date: May 11, 2023

(87) PCT Pub. No.: WO2022/169572
PCT Pub. Date: Aug. 11, 2022

(65) Prior Publication Data
US 2024/0025161 A1 Jan. 25, 2024

Related U.S. Application Data

(60) Provisional application No. 63/145,147, filed on Feb. 3, 2021.

(51) Int. Cl.
*B32B 27/08* (2006.01)
*B32B 27/32* (2006.01)
(Continued)

(52) U.S. Cl.
CPC .............. *B32B 27/08* (2013.01); *B32B 27/32* (2013.01); *B32B 37/153* (2013.01);
(Continued)

(58) Field of Classification Search
CPC ..... B32B 27/08; B32B 27/32; B32B 2323/04; B32B 2323/043; B32B 2323/046;
(Continued)

(56) References Cited

U.S. PATENT DOCUMENTS 8,043,674 B2   10/2011   Rehkugler et al.
8,273,447 B2 *   9/2012   Forloni .................. B32B 7/027
264/235.6
(Continued)

FOREIGN PATENT DOCUMENTS

CA        2977513        3/2018
WO    2012160436        11/2012
(Continued)

OTHER PUBLICATIONS

PCT/US2022/012217, International Search Report and Written Opinion with a mailing date of Apr. 7, 2022.

*Primary Examiner* — Joanna Pleszczynska
(74) *Attorney, Agent, or Firm* — Jacob R. Graham

(57) ABSTRACT

Provided are laminates including polyethylene and an extruded web layer. The laminates can be adhesiveless and fully compatible with polyethylene recycling streams. They can exhibit improved, maintained, or desirable properties in comparison to existing laminate structures that are not fully compatible with polyethylene recycling streams. The laminate comprises a first film, an extruded web layer, and a second film, where the extruded web layer is between the first film and a lamination layer of the second film and the laminate is formed via extrusion lamination of the extruded web layer.

12 Claims, 2 Drawing Sheets

(51) Int. Cl.
B32B 37/15         (2006.01)
B32B 37/00         (2006.01)

(52) U.S. Cl.
CPC . *B32B 2037/0092* (2013.01); *B32B 2307/518* (2013.01); *B32B 2307/7376* (2023.05)

(58) Field of Classification Search
CPC ...... B32B 2307/518; B32B 2307/7265; B32B 2307/7242
See application file for complete search history.

(56) References Cited

U.S. PATENT DOCUMENTS

| | | | |
|---|---|---|---|
| 9,676,172 B2 | 6/2017 | Rosa et al. | |
| 2009/0029081 A1 | 1/2009 | Lee et al. | |
| 2011/0076506 A1 | 3/2011 | Blok et al. | |
| 2011/0118679 A1* | 5/2011 | Bekele | B32B 27/32 604/408 |
| 2017/0087814 A1 | 3/2017 | Goel | |
| 2017/0232715 A1* | 8/2017 | Fehr | B65D 75/008 383/116 |
| 2020/0061982 A1* | 2/2020 | Ambroise | B32B 7/12 |
| 2020/0346440 A1* | 11/2020 | Pey | B32B 27/08 |

FOREIGN PATENT DOCUMENTS

| | | |
|---|---|---|
| WO | 2017155609 | 9/2017 |
| WO | 2019222332 | 11/2019 |
| WO | 2021247162 | 12/2021 |
| WO | 2021247163 | 12/2021 |

* cited by examiner

BARRIER LAMINATES INCLUDING ETHYLENE COPOLYMER EXTRUDED WEB LAYERS

TECHNICAL FIELD

Embodiments of the present disclosure generally relate to laminates, and more particularly relate to laminates including polyethylene and an extruded web layer.

INTRODUCTION

Laminates that incorporate polypropylene, polyamide, and polyethylene terephthalate contain multiple layers and are widely used in flexible packaging for consumer products. For example, a laminate can be formed for flexible packaging that includes an outer printing substrate of a biaxially oriented polypropylene (BOPP), a polyurethane based-adhesive, a barrier layer of metalized films, and a sealant layer of polyethylene. The combination of layers and materials can allow for heat-resistance for a wide sealing window, good printability, high barrier performance, and sealing without shrinkage. But such laminates can be difficult, if not impossible, to recycle together due to the different types of materials that are not recycle-compatible with each other. As demand for sustainable and recyclable materials continues to rise, there remains a strong need for laminates that can be recycled more easily and that exhibit comparable or improved performance properties to existing structures.

SUMMARY

Embodiments of the present disclosure meet one or more of the foregoing needs by providing laminates that can be formed via extrusion lamination and bonded with an extrusion web layer including a recycle-compatible polyethylene. The laminates can be fully recycle-compatible in polyethylene recycling streams in some embodiments. The performance of the inventive laminates can be better or at least comparable to other laminates, such as laminates comprising BOPP, and for example, can allow for use of faster packaging speeds during manufacturing in some embodiments. In some aspects, the recyclable laminates can exhibit improved or maintained properties, such as bond strength, oxygen transmission rate (OTR), water vapor transmission rate (WVTR), heat seal initiation temperatures (HSIT), heat seal strength, hot tack strength, hot tack initiation temperature, and/or shrinkage, when compared to existing laminates.

Disclosed herein are laminates. In one aspect, the laminate comprises (a) a first film comprising at least 95 wt. % polyethylene; (b) a second film comprising: (i) a lamination layer comprising an ethylene copolymer selected from the group consisting of an ethylene/vinyl acetate copolymer, ethylene/acrylic acid copolymer, ethylene/acrylate copolymer, anhydride-modified ethylene/acrylate copolymer, anhydride-modified polyethylene, anhydride-modified ethylene/vinyl acetate copolymer, polyethylene elastomer/plastomer, and combinations thereof; (ii) a sealant layer, wherein the sealant layer comprises at least 70 wt. % of a polymer having a highest peak melting temperature ($T_m$) of 108° C. or less; (iii) a barrier layer comprising an ethylene vinyl alcohol copolymer; (iv) a first tie layer between the lamination layer and the barrier layer; and (v) a second tie layer between the barrier layer and the sealant layer; and (c) an extruded web layer adhering the lamination layer of the second film to the first film, the extruded web layer comprising at least one of an ethylene/methyl acrylate copolymer, ethylene/butyl acrylate copolymer, ethylene/ethyl acrylate copolymer, ethylene/vinyl trimethoxy silane copolymer, ethylene/vinyl acetate copolymer, ethylene/acrylic acid copolymer, ethylene/methacrylic acid copolymer, maleic anhydride-modified polyethylene, ethylene-acid terpolymer, or ethylene/methacrylic acid/acrylate terpolymer.

These and other embodiments are described in more detail in the Detailed Description.

DETAILED DESCRIPTION

Figure 1:
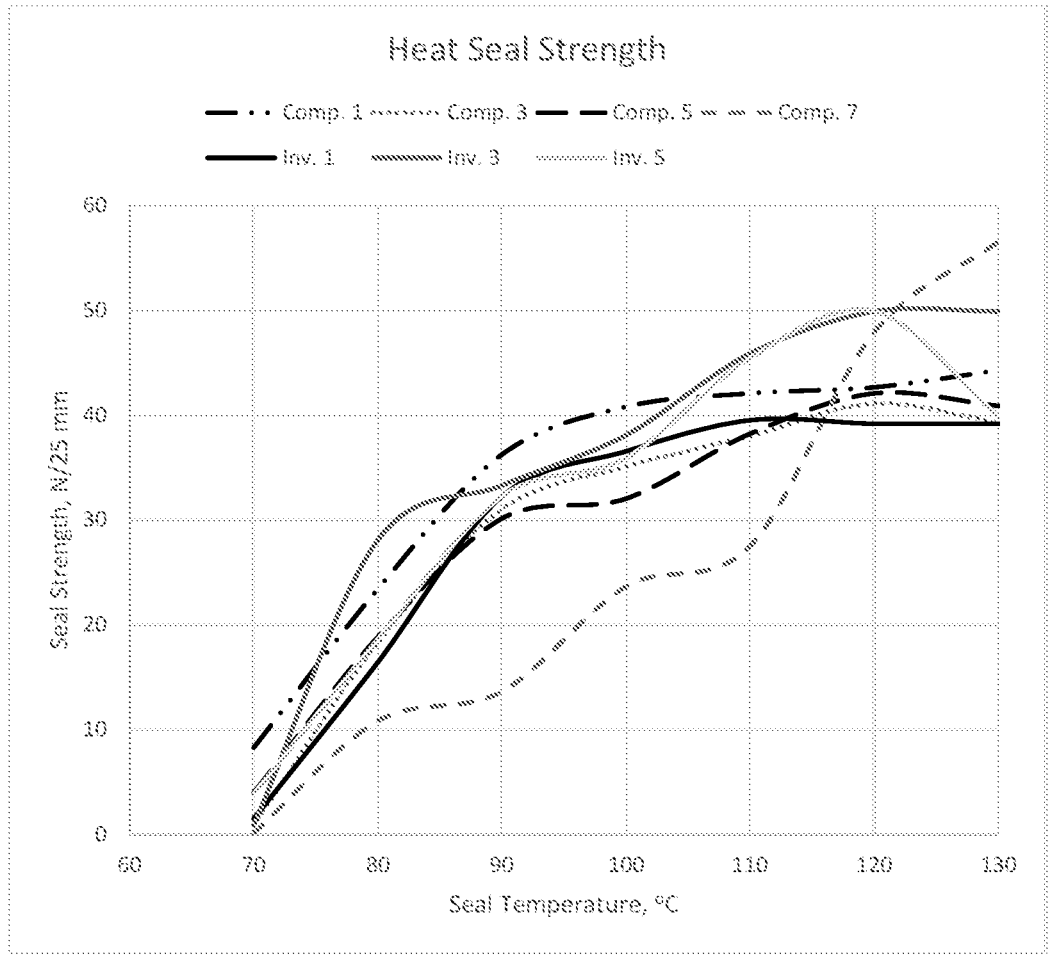
FIG. 1 is a heat seal strength graph of Comparative and Inventive Examples discussed below.

Aspects of the disclosed laminates are described in more detail below. The laminates can have a wide variety of applications, including, for example, pouches, stand-up pouches, pillow pouches, bulk bags, pre-made packages, sachets, or the like. This disclosure, however, should not be construed to limit the embodiments set forth below as this disclosure is an illustrative implementation of the embodiments described herein.

As used herein, the term "polymer" means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the term "copolymer" means a polymer formed by the polymerization reaction of at least two structurally different monomers. The term "copolymer" is inclusive of terpolymers. For example, ethylene copolymers such as ethylene/vinyl acetate copolymer, ethylene/acrylic acid copolymer, and ethylene/acrylate copolymer include at least two structurally different monomers (e.g., ethylene/vinyl acetate copolymer includes copolymerized units of at least ethylene monomer and vinyl acetate monomer; ethylene/acrylic acid copolymer includes units of at least ethylene monomer and acrylic acid monomer; and ethylene/acrylate copolymer includes units of at least ethylene monomer and acrylate monomer) and can optionally include additional monomers or functional materials or modifiers, such as acid, acrylate, or anhydride functional groups. Put another way, the copolymers described herein comprise at least two structurally different monomers, and although the copolymers may consist of only two structurally different monomers, they do not necessarily consist of only two structurally different monomers and may include additional monomers or functional materials or modifiers.

As used herein, the terms "polyethylene" or "ethylene-based polymer" shall mean polymers comprising a majority amount (>50 mol %) of units which have been derived from ethylene monomer. This includes polyethylene homopolymers and copolymers (meaning units derived from two or more comonomers). Unless expressly stated otherwise, the ethylene copolymers or terpolymers disclosed herein (e.g., ethylene/vinyl acetate copolymer, ethylene/acrylic acid copolymer, ethylene/acrylate copolymer, anhydride-modified ethylene/acrylate copolymer, anhydride-modified polyethylene, anhydride-modified ethylene/vinyl acetate copolymer, polyethylene plastomer, polyethylene elastomer, ethylene/butyl acrylate copolymer, ethylene/ethyl acrylate copolymer, ethylene/vinyl trimethoxy silane copolymer, ethylene/vinyl acetate copolymer, ethylene/acrylic acid copolymer, ethylene/methacrylic acid copolymer, maleic anhydride-modified polyethylene, ethylene-acid terpolymer, or ethylene/methacrylic acid/acrylate terpolymer) are ethylene-based polymers.

Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm³.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272, 236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076, 698; and/or blends thereof (such as those disclosed in U.S. Pat. No. 3,914,342 or U.S. Pat. No. 5,854,045). LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm³. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 g/cm³ and up to about 0.980 g/cm³, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm³, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers.

As used herein, the terms "polyethylene elastomer/plastomer" or ethylene-based plastomers (POP) and ethylene-based elastomers (POE) shall mean a substantially linear, or linear, ethylene/α-olefin copolymer containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Polyethylene elastomers/plastomers have a density from 0.865 g/cm³, or 0.870 g/cm³, or 0.880 g/cm³, or 0.890 g/cm³ to 0.900 g/cm³, or 0.902 g/cm³, or 0.904 g/cm³, or 0.909 g/cm³, or 0.910 g/cm³. Nonlimiting examples of polyethylene elastomers/plastomers include AFFINITY™ plastomers and elastomers (available from The Dow Chemical Company), EXACT™ plastomers (available from ExxonMobil Chemical), Tafmer (available from Mitsui), Nexlene™ (available from SK Chemicals Co.), and Lucene™ (available LG Chem Ltd.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Disclosed herein are laminates. The laminates according to embodiments disclosed herein comprises a first film, a second film, and an extruded web layer, where the second film comprises a lamination layer and the extruded web layer adheres the lamination layer of the second film to the first film to form the laminates.

First Film of the Laminate

The laminates disclosed herein comprise a first film. The first film according to embodiments disclosed herein is adhered to a lamination layer of a second film (described below) via an extruded web layer (also described below). The first film according to embodiments disclosed herein comprises at least 95 wt. % polyethylene, based on total weight of the first film. All individual values and subranges of at least 95 wt. % polyethylene are included and disclosed herein. For example, the first film can comprise at least 95 wt. %, at least 96 wt. %, at least 97 wt. %, at least 98 wt. %, or at least 99 wt. % polyethylene, based on total weight of the first film; or the first film can comprise from 95 to 100 wt. %, from 96 to 100 wt. %, from 97 to 100 wt. %, from 98 to 100 wt. %, from 99 to 100 wt. %, from 95 to 99 wt. %, from 95 to 98 wt. %, from 95 to 97 wt. %, from 95 to 96 wt. %, from 96 to 99 wt. %, from 96 to 98 wt. %, from 96 to 97 wt. %, from 97 to 99 wt. %, from 97 to 98 wt. %, or from 98 to 99 wt. % of polyethylene based on total weight of the first film.

Other than comprising at least 95 wt. % polyethylene, the first film of the laminate is not particularly limited. For example, in some embodiments, the first film can comprise a single layer or multiple layers. In some embodiments, the first film can be an oriented film that is oriented in the machine and/or cross direction. In some embodiments, the first film is a blown film. In other embodiments, the first film is a cast film.

In some embodiments, the first film can comprise an ethylene-based polymer having a density from 0.900 to 0.970 g/cm$^3$. All individual values and subranges of from 0.900 to 0.970 g/cm$^3$ are disclosed and included herein. For example, the ethylene-based polymer can have a density of from 0.900 to 0.970 g/cm$^3$, 0.910 to 0.957 g/cm$^3$, 0.920 to 0.947 g/cm$^3$, 0.920 to 0.937 g/cm$^3$, 0.920 to 0.930 g/cm$^3$, or 0.920 to 0.927 g/cm$^3$.

In some embodiments, the ethylene-based polymer of the first film can have a melt index (I$_2$) of from 0.1 g/10 min to 10 g/10 min, or from 0.5 g/10 min to 8 g/10 min, or from 0.5 g/10 min to 5 g/10 min.

In some embodiments, the ethylene-based polymer of the first film can comprise at least 50 wt. % of the first film, based on the total weight of the first film. All individual values and subranges of at least 50 wt. % are disclosed and included herein. For example, the ethylene-based polymer can comprise at least 50 wt. %, at least 75 wt. %, at least 90 wt. %, at least 99 wt. %, or at least 99.9 wt. % of the first film, based on the total weight of the first film.

In addition to the ethylene-based polymer, the first film, in some embodiments, can further comprise at least one additional polymer, and the at least one additional polymer can be selected from the group of ultra low density polyethylene, low density polyethylene, polyethylene elastomer/plastomer, ethylene vinyl alcohol copolymer (EVOH), ethylene vinyl acetate copolymer, ethylene acrylic acid copolymer, or combinations thereof in an amount of less than 5 wt. % of the first film.

In some embodiments, the first film is a machine direction oriented film. In other embodiments, the first film is biaxially oriented. In such embodiments, the first film can be a biaxially oriented polyethylene (BOPE) film. In some embodiments in which the first film is a BOPE film, the BOPE film may be biaxially oriented using a tenter frame sequential biaxial orientation process, and may be referred to as tenter frame biaxially oriented polyethylene (TF-BOPE). Such techniques are generally known to those of skill in the art. In other embodiments, the first film can be biaxially oriented using other techniques known to those of skill in the art based on the teachings herein, such as a double bubble orientation process. In general, with a tenter frame sequential biaxial orientation process, the tenter frame is incorporated as part of an extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled.

After stretching in the machine direction, the film web is passed into a tenter frame hot air oven with heating zones to carry out stretching in the cross direction. The first several zones are for pre-heating, followed by zones for stretching, and then the last zones for annealing.

In some embodiments, the first film can be a monolayer TF-BOPE film comprising an ethylene-based polymer. In other embodiments, the first film comprises at least two layers. For example, in some embodiments, the first film can be a multilayer TF-BOPE film comprising three layers (e.g. an A/B/C structure, TF-BOPE film made by co-extruding three layers using a single ethylene-based polymer resin). Embodiments of the first film can include ties layer, sealant layers, or barrier layers, for example. In some embodiments, the first film comprises a barrier layer comprising an ethylene vinyl alcohol copolymer.

In some embodiments, the first film can be oriented in the machine direction at a draw ratio of 2:1 to 6:1, or in the alternative, at a draw ratio of 3:1 to 5:1. The first film, in embodiments, can be oriented in the cross direction at a draw ratio of 2:1 to 9:1, or in the alternative, at a draw ratio of 3:1 to 8:1.

In some embodiments, depending for example on the end use application, the first film can be corona treated or printed using techniques known to those of skill in the art before or after extrusion lamination to the second film.

The first film can have a variety of thicknesses depending, for example, on the number of layers. For example, in some embodiments, the first film can have a thickness of from 10 to 200 microns, or alternatively, of from 10 to 100 microns, or alternatively, of from 10 to 50 microns, or alternatively, of from 15 to 25 microns.

Second Film of the Laminate

The laminates disclosed herein comprise a second film. The second film according to embodiments disclosed herein includes a lamination layer, a barrier layer, a sealant layer, a first tie layer, and a second tie layer.

Lamination Layer of Second Film

The second film of the laminate comprises a lamination layer. The lamination layer is an outer layer of the second film that acts as a functional or bonding layer that is adhered to the first film (described above) via an extruded web layer (described below) in forming the laminate. The lamination layer according to embodiments disclosed herein assists or enables a high bonding strength of the extruded web layer to prevent delamination from the second film.

In some embodiments, the lamination layer of the second film comprises an ethylene copolymer selected from the group consisting of an ethylene/vinyl acetate copolymer, ethylene/acrylic acid copolymer, ethylene/acrylate copolymer, anhydride-modified ethylene/acrylate copolymer, anhydride-modified polyethylene, anhydride-modified ethylene/vinyl acetate copolymer, polyethylene elastomer/plastomer, and combinations thereof.

In some embodiments where the lamination layer comprises an ethylene/vinyl acetate copolymer, the ethylene/vinyl acetate copolymer can have a density in the range of from 0.930 to 0.980 g/cm$^3$. All individual values and subranges of a density of from 0.930 to 0.980 g/cm$^3$ are disclosed and included herein; for example, the ethylene/vinyl acetate copolymer can have a density in the range of from 0.930 to 0.980 g/cm$^3$, 0.935 to 0.970 g/cm$^3$, 0.935 to 0.950 g/cm$^3$, 0.935 to 0.945 g/cm$^3$, or 0.940 to 0.945 g/cm$^3$.

In some embodiments where the lamination layer comprises an ethylene/vinyl acetate copolymer, the ethylene/vinyl acetate copolymer can have a melt index (I$_2$) of from 0.1 g/10 min to 500 g/10 min, or from 0.2 g/10 min to 400 g/10 min, or from 0.5 g/10 min to 100 g/10 min or from 0.1 to 30 g/10 min, or from 0.1 to 10 g/10 min.

In some embodiments where the lamination layer comprises an ethylene/vinyl acetate copolymer, the ethylene/vinyl acetate copolymer can have from 5 to 50 wt. % vinyl acetate content, based on the total weight of the ethylene/vinyl acetate copolymer. All individual values and subranges of from 5 to 50 wt. % vinyl acetate content are disclosed and included herein. For example, in some embodiments, the ethylene/vinyl acetate copolymer can have from 5 to 10 wt. %, from 10 to 30 wt. %, or from 30 to 50 wt. % vinyl acetate content, based on total weight of the ethylene/vinyl acetate copolymer.

Examples of commercially available ethylene/vinyl acetate copolymers that can be used in the lamination layer include ELVAX™ 470 (18% wt. % vinyl acetate content) available from The Dow Chemical Company, Midland, MI.

In some embodiments where the lamination layer comprises an ethylene/acrylate copolymer, the ethylene/acrylate copolymer can have a density in the range of from 0.925 to 0.955 g/cm$^3$. All individual values and subranges of a density of from 0.925 to 0.955 g/cm$^3$ are disclosed and included herein; for example, the ethylene/acrylate copolymer can have a density in the range of from 0.925 to 0.955 g/cm$^3$, 0.925 to 0.945 g/cm$^3$, 0.930 to 0.955 g/cm$^3$, 0.930 to 0.945 g/cm$^3$, 0.935 to 0.955 g/cm$^3$, or 0.935 to 0.945 g/cm$^3$.

In some embodiments where the lamination layer comprises an ethylene/acrylate copolymer, the ethylene/acrylate copolymer can have a melt index ($I_2$) of from 0.1 g/10 min to 50 g/10 min, or from 0.5 g/10 min to 20 g/10 min, or from 1.0 g/10 min to 10 g/10 min.

Commercially available examples of ethylene/acrylate copolymers that can be used in the lamination layer include those commercially available from The Dow Chemical Company (Midland, MI) under the name BYNEL™, including, for example, BYNEL™ 22E780 Adhesive Resin and BYNEL™ 22E757 Adhesive Resin.

In some embodiments where the lamination layer comprises a polyethylene elastomer/plastomer, the polyethylene elastomer/plastomer can have a density in the range of from 0.865 to 0.910 g/cm$^3$. All individual values and subranges of a density of from 0.865 to 0.910 g/cm$^3$ are disclosed and included herein; for example, the polyethylene elastomer/plastomer can have a density in the range of from 0.865 to 0.910 g/cm$^3$, 0.865 to 0.900 g/cm$^3$, 0.865 to 0.890 g/cm$^3$, 0.865 to 0.880 g/cm$^3$, 0.870 to 0.910 g/cm$^3$, 0.870 to 0.900 g/cm$^3$, 0.870 to 0.890 g/cm$^3$, 0.870 to 0.880 g/cm$^3$, 0.880 to 0.910 g/cm$^3$, 0.880 to 0.900 g/cm$^3$, 0.880 to 0.890 g/cm$^3$, 0.890 to 0.910 g/cm$^3$, 0.890 to 0.900 g/cm$^3$, or 0.900 to 0.910 g/cm$^3$.

In embodiments where the lamination layer comprises a polyethylene elastomer/plastomer, the polyethylene elastomer/plastomer can have a melt index ($I_2$) in the range of from 0.50 to 20 g/10 minutes (g/10 min). All individual values and subranges of a melt index of from 0.50 to 20 g/10 min are disclosed and include herein; for example, the polyethylene elastomer/plastomer can have a melt index ($I_2$) of a lower limit of 0.50, 1.0, 2.0, 5.0, 10.0, 15, or 18 g/10 min to an upper limit of 1.0, 2.0, 5.0, 10.0, 15, 18, 19, or 20 g/10 min.

Commercially available examples of polyethylene plastomers/elastomers that can be used in the lamination layer include those commercially available from The Dow Chemical Company (Midland, MI) under the name AFFINITY™, including, for example, AFFINITY™ VP 8770G1, AFFINITY™ PF7266, AFFINITY™ PL 1881G, and AFFINITY™ PF1140G.

In some embodiments, the lamination layer further comprises at least one of a linear low density polyethylene, low density polyethylene, medium density polyethylene, or high density polyethylene. In such embodiments, the lamination layer can comprise up to 50 wt. % of at least one of a linear low density polyethylene, low density polyethylene, medium density polyethylene, or high density polyethylene.

Barrier Layer of Second Film

The second film of the laminate comprises a barrier layer.

In some embodiments, the barrier layer of the second film can be positioned next or in proximity to a first tie layer (described below) and the lamination layer (described above). The barrier layer according to embodiments disclosed herein comprises an ethylene vinyl alcohol copolymer (EVOH).

In some embodiments, the EVOH of the barrier layer has an ethylene content of from 20 to 50 mol %. All subranges and individual values of an ethylene content of from 20 to 50 mol % are disclosed and included herein. For example, in some embodiments, the EVOH of the barrier layer has an ethylene content of from 20 to 50 mol %, or 22 to 45 mol %, or 25 to 40 mol %. A person of ordinary skill in the art will appreciate that the ethylene content of the EVOH can contribute to lower or higher OTR of the laminate disclosed herein (i.e., in general, the lower the ethylene content, the lower the achievable OTR value is). A person of ordinary skill in the art will also appreciate that a barrier layer comprising an EVOH with lower ethylene content may be suitable for flexible bottle and tube applications and a barrier layer comprising an EVOH with higher ethylene content may allow for easier processing, long-term run stability, and packaging types requiring flexibility (flex crack resistance), such as, thermoformability.

Commercially available examples of EVOH that can be used in the barrier layer include those commercially available from Kuraray Co., Ltd. (Tokyo, Japan) under the name EVAL, including, for example, EVAL H171B (38 mol % ethylene content), and EVAL F171B (32 mol % ethylene content).

Various thicknesses are contemplated for the second film. In some embodiments, the barrier layer is 5 to 25% of the overall thickness of the second film.

Sealant Layer of Second Film

The second film of the laminates comprise a sealant layer.

The sealant layer of the second film comprises at least 70 wt. % of a polymer having a highest peak melting temperature ($T_m$) of 108° C. or less. The sealant layer can act as an inside surface of the laminate and, for example, can provide a way for sealing a package around a packaged product. The composition of the sealant layer can influence the ability of the laminate and sealant layer to obtain a high sealing bond strength at lower sealing temperatures. In some embodiments, the sealant layer is at least 10 microns thick. In further embodiments, the sealant layer is 25 to 60% of overall thickness of the second film.

The sealant layer of the second film comprises at least 70 wt. % of a polymer, based on the total weight of the sealant layer. All individual values and subranges of at least 70 wt. % are disclosed and included herein. For example, in some embodiments, the sealant layer can comprise at least 70 wt. %, at least 80 wt. %, at least 90 wt. %, at least 95 wt. %, at least 99 wt. %, at least 99.5 wt. %, or from 70 wt. % to 100 wt. %, 75 wt. % to 99 wt. %, 80 wt. % to 95 wt. %, or 90 to 95 wt. % of a polymer, based on the total weight of the sealant layer.

The sealant layer of the second film comprises at least 70 wt. % of a polymer having a highest peak melting temperature ($T_m$) of 108° C. or less. All individual values and subranges of 108° C. or less are disclosed and included herein. For example, in some embodiments, the polymer of the sealant layer has a highest peak melting temperature ($T_m$) of 108° C. or less, 106° C. or less, 104° C. or less, 102° C. or less, 100° C. or less, 98° C. or less, 96° C. or less, 94° C. or less, or 92° C. or less, or in the range of from 70° C. to 108° C., 70° C. to 100° C., 70° C. to 95° C., 75° C. to 108° C., 75° C. to 100° C., or 75° C. to 95° C., where highest peak melting temperature ($T_m$) can be measured in accordance with the DSC test method described below.

In some embodiments, the polymer of the sealant layer comprises or consists of a polyethylene elastomer/plastomer that has a highest peak melting temperature ($T_m$) of 108° C. or less. In such embodiments, the polyethylene elastomer/plastomer of the sealant layer can have a density in the range of from 0.865 to 0.910 g/cm³. All individual values and subranges of a density of from 0.865 to 0.910 g/cm³ are disclosed and included herein; for example, the polyethylene elastomer/plastomer can have a density in the range of from 0.865 to 0.910 g/cm³, 0.865 to 0.900 g/cm³, 0.865 to 0.890 g/cm³, 0.865 to 0.880 g/cm³, 0.865 to 0.870 g/cm³, 0.870 to 0.910 g/cm³, 0.870 to 0.900 g/cm³, 0.870 to 0.890 g/cm³, 0.870 to 0.880 g/cm³, 0.880 to 0.910 g/cm³, 0.880 to 0.900 g/cm³, 0.880 to 0.890 g/cm³, 0.890 to 0.910 g/cm³, 0.890 to 0.900 g/cm³, or 0.900 to 0.910 g/cm³.

In some embodiments where the polymer of the sealant layer comprises or consists of a polyethylene elastomer/plastomer, the polyethylene elastomer/plastomer can have a melt index ($I_2$) in the range of from 0.50 to 20 g/10 minutes (g/10 min). All individual values and subranges of a melt index of from 0.50 to 20 g/10 min are disclosed and include herein; for example, the polyethylene elastomer/plastomer can have a melt index of a lower limit of 0.50, 1.0, 2.0, 5.0, 10.0, 15, or 18 g/10 min to an upper limit of 1.0, 2.0, 5.0, 10.0, 15, 18, 19, or 20 g/10 min.

Commercially available examples of polyethylene elastomers/plastomers that can be used in the sealant layer include those commercially available from The Dow Chemical Company (Midland, MI) under the name AFFINITY™, including, for example, AFFINITY™ VP 8770G1, AFFINITY™ PF7266, AFFINITY™ PL 1881G and AFFINITY™ PF1140G.

In some embodiments, the polymer of the sealant layer comprises or consists of an ionomer of ethylene (meth) acrylic acid copolymer (referred herein also as an "ionomer of ethylene acid copolymer") that has a highest peak melting temperature ($T_m$) of 108° C. or less. The cation source of the ionomer of ethylene acid copolymer may be a mono- or divalent cation source, including formates, acetates, hydroxides, nitrates, carbonates, and bicarbonates. In some embodiments, the ionomer of ethylene acid copolymer may have been treated with one or more cations or cation sources which may comprises magnesium, sodium, zinc, or combinations thereof.

In some embodiments, the ethylene content of the ionomer of ethylene acid copolymer is greater than 50 wt. %, or greater than 60 wt. %, based on the total weight of the ionomer of ethylene acid copolymer. For example, the ethylene content of the ionomer of ethylene acid copolymer can be from 50 wt. % to 95 wt. %, from 50 wt. % to 90 wt. %, from 50 wt. % to 85 wt. %, or from 60 wt. % to 80 wt. %, based on total weight of the ionomer of ethylene acid copolymer.

In some embodiments, the ionomer of ethylene acid copolymer has a melt index ($I_2$) of from 0.1 g/10 min to 16 g/10 min, from 0.5 g/10 min to 16 g/10 min, from 2 g/10 min to 16 g/10 min, from 3 g/10 min to 13 g/10 min, from 0.5 g/10 min to 6 g/10 min, from 3.5 g/10 min to 10 g/10 min, or from 5 g/10 min to 8 g/10 min. Commercially available ionomers of ethylene acid copolymer include those available under the name SURLYN™ from The Dow Chemical Company (Midland, MI).

In some embodiments, the polymer of the sealant layer comprises or consists of a polyethylene that has a highest peak melting temperature ($T_m$) of 108° C. or less. For example, in some embodiments, the polymer of the sealant layer can comprise or consists of a linear low density polyethylene (LLDPE). The linear low density polyethylene can have a density less than or equal to 0.930 g/cm³. All individual values and subranges less than or equal to 0.930 g/cm³ are included and disclosed herein; for example, the density of the linear low density polyethylene can be from a lower limit of 0.870 g/cm³ to an upper limit of 0.928, 0.925, 0.920 or 0.915 g/cm³. All individual values and subranges between 0.870 and 0.930 g/cm³ are included and disclosed herein.

Commercially available examples of polyethylenes that can be used in the sealant layer include those commercially available from The Dow Chemical Company under the name ELITE™ AT including, for example, ELITE™ AT 6202 and ELITE™ AT 6410.

In addition to the at least 70 wt. % of a polymer having a highest peak melting temperature ($T_m$) of 108° C. or less, the sealant layer, in some embodiments, can further comprise at least one additional polymer and/or at least one additive. For example, the at least one additional polymer can be selected from the group of a polyethylene, ethylene vinyl acetate, ethylene acrylic acid, or combinations thereof in an amount of less than 30 wt. % of the sealant layer. And for example, the at least one additive can be selected from the group of antioxidants, ultraviolet light stabilizers, thermal stabilizers, slip agents, antiblock agent, antistatic agents, pigments or colorants, processing aids, crosslinking catalysts, flame retardants, fillers, foaming agents, or combinations thereof in an amount of less than 30 wt. % of the sealant layer.

First and Second Tie Layer of Second Film

The second film comprises a first tie layer between the lamination layer and the barrier layer. The first tie layer can adhere the barrier layer to the lamination layer. The second film also comprises a second tie layer between the barrier layer and the sealant layer. The second tie layer can adhere the barrier layer to the sealant layer. The first tie layer and the second tie layer can have the same polymer composition or different polymer composition.

In some embodiments, the first tie layer and/or second tie layer comprises an adhesive resin selected from the group consisting of anhydride grafted ethylene-based polymer, ethylene/acrylate copolymer, ethylene acid copolymer, and ethylene/vinyl acetate copolymer. Examples of anhydride grafting moieties may include but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, bicyclo(2.2.2)oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,

11

12

3-dicarboxylic acid anhydride. In one embodiment, the anhydride grafting moiety comprises maleic anhydride.

In some embodiments, the first tie layer and/or second tie layer comprises at least one of an anhydride-modified linear low density polyethylene, a linear low density polyethylene, low density polyethylene, medium density polyethylene, or high density polyethylene. For example, in some embodiments, the first tie layer and/or second tie layer comprises an anhydride-modified linear low density polyethylene. In some embodiments, the anhydride-modified linear low density polyethylene has a density in the range of from 0.860 $g/cm^3$ to 0.935 $g/cm^3$. All individual values and subranges of from 0.860 $g/cm^3$ to 0.935 $g/cm^3$ are disclosed and included herein; for example, the anhydride-modified linear low density polyethylene can have a density in the range of from 0.875 $g/cm^3$ to 0.935 $g/cm^3$, 0.900 $g/cm^3$ to 0.925 $g/cm^3$, 0.910 $g/cm^3$ to 0.935 $g/cm^3$, 0.910 $g/cm^3$ to 0.925 $g/cm^3$, 0.915 $g/cm^3$ to 0.935 $g/cm^3$, or 0.920 $g/cm^3$ to 0.930 $g/cm^3$. In some embodiments, the anhydride-modified linear low density polyethylene has a melt index ($I_2$) from 0.1 g/10 min to 50 g/10 min, or from 0.5 g/10 min to 20 g/10 min, or from 1.0 g/10 min to 10 g/10 min.

In some embodiments, the first tie layer and/or second tie layer comprises from 0 to 100 wt. % of the anhydride-modified linear low density polyethylene, based on the total weight of the tie layer in which the anhydride-modified linear low density polyethylene is present. All individual values and subranges of from 0 to 100 wt. % are disclosed and included herein. For example, in some embodiments, the first tie layer and/or second tie layer can comprise from 10 to 90 wt. %, 20 to 80 wt. %, 30 to 70 wt. %, or 40 to 60 wt. % of the anhydride-modified linear low density polyethylene, based on the total weight of the tie layer in which the anhydride-modified linear low density polyethylene is present.

Examples of commercially available anhydride-modified linear low density polyethylenes that can be used in embodiments include BYNEL™ Series 4100 resins, such as BYNEL™ 41E710 and BYNEL™ 41E687, available from The Dow Chemical Company (Midland, MI).

In some embodiments, the first tie layer and/or second tie layer comprises at least one of a linear low density polyethylene, low density polyethylene, medium density polyethylene, or high density polyethylene. For example, in some embodiments, the first tie layer and/or second tie layer comprises a high density polyethylene having a density in the range of from 0.945 $g/cm^3$ to 0.970 $g/cm^3$. All individual values and subranges of from 0.945 $g/cm^3$ to 0.970 $g/cm^3$ are disclosed and included herein; for example, the high density polyethylene can have a density in the range of from 0.945 $g/cm^3$ to 0.965 $g/cm^3$, 0.950 $g/cm^3$ to 0.970 $g/cm^3$, 0.950 $g/cm^3$ to 0.965 $g/cm^3$, 0.955 $g/cm^3$ to 0.970 $g/cm^3$, 0.955 $g/cm^3$ to 0.965 $g/cm^3$, or 0.955 $g/cm^3$ to 0.965 $g/cm^3$.

In embodiments where a high density polyethylene is present in the first tie layer and/or second tie layer, the high density polyethylene can be a copolymer of ethylene and $C_3$-$C_{12}$ comonomer. In some embodiments, the first tie layer and/or second tie layer comprises from 0 to 90 wt. % of a high density polyethylene, based on the total weight of the tie layer in which the high density polyethylene is present. All individual values and subranges of from 0 to 90 wt. % are disclosed and included herein. For example, in some embodiments, the tie layer can comprise from 10 to 90 wt. %, 20 to 80 wt. %, 30 to 70 wt. %, or 40 to 60 wt. % of a high density polyethylene, based on the total weight of the tie layer in which the high density polyethylene is present. In some embodiments, the melt index ($I_2$) of the high density polyethylene can be from 0.3 to 10.0 g/10 min, from 0.3 to 7.0 g/10 min, from 0.3 to 5.0 g/10 min, from 0.3 to 4.0 g/10 min, from 0.3 to 3.0 g/10 min, from 0.3 to 2.0 g/10 min or from 0.3 to 1.5 g/10 min, or from 0.5 to 1.0 g/10 min.

Commercially available examples of a high density polyethylene that can be used in the tie layer include those commercially available from The Dow Chemical Company (Midland, MI) under the name ELITE™ 5960G1, ELITE™ AT 6900, and DOWLEX™ 2006G.

Extruded Web Layer

The laminates also comprise an extruded web layer. The extruded web layer adheres the lamination layer of the second film to the first film. In particular, the extruded web layer can be formed via extrusion lamination where an extrudate or molten polymer stream exiting an extrusion die is extruded between the first film and the lamination layer of the second film such that the extruded web layer adheres the lamination layer to the first film. The laminate can be formed by passing the first film and the second film with the extruded web layer in between a pair of rollers.

In some embodiments, the extruded web layer comprises at least one of an ethylene/methyl acrylate copolymer, ethylene/butyl acrylate copolymer, ethylene/ethyl acrylate copolymer, ethylene/vinyl trimethoxy silane copolymer, ethylene/vinyl acetate copolymer, ethylene/acrylic acid copolymer, ethylene/methacrylic acid copolymer, maleic anhydride-modified polyethylene, ethylene-acid terpolymer, or ethylene/methacrylic acid/acrylate terpolymer. In other embodiments, the extruded web layer comprises at least one of an ethylene/methyl acrylate copolymer, ethylene/methacrylic acid/acrylate terpolymer, or ethylene/vinyl acetate copolymer.

In some embodiments, the polymer of the extruded web layer has a highest peak melting temperature ($T_m$) of 105° C. or less, 104° C. or less, 103° C. or less, 102° C. or less, 101° C. or less, 100° C. or less, 98° C. or less, 96° C. or less, or 94° C. or less, or in the range of from 70° C. to 105° C., 70° C. to 100° C., 70° C. to 95° C., 75° C. to 105° C., 75° C. to 100° C., or 75° C. to 95° C., where highest peak melting temperature ($T_m$) can be measured in accordance with the DSC test method described below. Without being bound by any theory, the use of a polymer having a highest peak melting temperature ($T_m$) of 105° C. or less permits for a lower coating temperature (less than 250° C.), as compared to conventional LDPE extrusion web layers (290-310° C.), enhances adhesion, and prevents shrinkage or wrinkle when the laminate is formed.

Examples of ethylene/methyl acrylate copolymers suitable for use in the extruded web layer include ELVALOY™ AC 12024S Acrylate Copolymer, commercially available from the Dow Chemical Company (Midland, MI). Examples of ethylene/methacrylic acid/acrylate terpolymers suitable for use in the extruded web layer include NUCREL™ N0427HS, commercially available from the Dow Chemical Company (Midland, MI). Examples of ethylene/vinyl acetate copolymers suitable for use in the extruded web layer include ELVAX™ 3180 Ethylene Vinyl Acetate Copolymer, commercially available from the Dow Chemical Company (Midland, MI).

Additives

It should be understood that any of the foregoing layers, including the extruded web layer and the layers of the films, can further comprise one or more additives as known to those of skill in the art such as, for example, antioxidants, ultraviolet light stabilizers, thermal stabilizers, slip agents, antiblock agents, antistatic agents, pigments or colorants, processing aids, crosslinking catalysts, flame retardants, fillers and foaming agents. For example, in some embodiments, the sealant layer of the second film comprises at least one of a slip agent or antiblock agent.

The Laminate

Laminates of the present invention, in various embodiments, can have several desirable properties. In some embodiments, the laminate has a thickness between 50 and 150 microns, or alternatively between 75 and 125 microns, or alternatively between 90 and 110 microns.

In some embodiments, the laminate of the present invention comprises at least 90 wt. % ethylene-based polymer, or at least 95 wt. % ethylene-based polymer, or at least 99 wt. % ethylene-based polymer, or at least 99.5 wt. % ethylene-based polymer, or at least 99.9 wt. % ethylene-based polymer, based on the overall weight of the laminate. Because the laminates in some embodiments comprise at least 90 wt. % ethylene-based polymer, they can be compatible with polyethylene recycling streams.

In some embodiments, the laminate of the present invention is free of a laminating adhesive (e.g., a solvent-based or waterborne laminating adhesive such as those adhesives commercially available from The Dow Chemical Company under the trade names MOR-FREE™ (solventless laminating adhesive based on polyurethane technologies), ADCOTE™ (solvent based laminating adhesives having two-component polyurethane systems), ROBOND™ (water-based adhesives having one- or two-component acrylic co-polymers)). As used herein, the term "laminating adhesive" refers to a liquid suspension or emulsion of a chemical substance (e.g., polyurethane or polyacrylate) to bond two surfaces which is applied using a conventional dry-laminator or solventless laminator coating equipment to coat a first substrate with the laminating adhesive, dried to form an adhesive layer, and brought into contact with pressure to a second substrate to form an immediate bond with subsequent curing to form a laminate. The term "laminating adhesive," as used herein, does not include "an extruded web layer" (i.e., a layer formed via extrusion lamination where an extrudate or molten polymer stream exiting an extrusion die is extruded between films). The extruded web layer described herein can be formed via extrusion lamination without requiring solvent or water drying through a drying tunnel and subsequent curing conditions. The extruded web layer can use polar-polar interactions between polymers of the films and ethylene copolymer(s) of the extruded web layer (along with heat and pressure) to form a bond between the first and second film.

Laminates of the present invention can have one or more of the following properties: a bond strength of at least 2.00 N/25 mm; an OTR of less than 3.00 cm$^3$/day/m$^2$; a WVTR of less than 5.50 g/day/m$^2$; a heat seal initiation temperature at 5N of less than 110° C.; a seal strength at 120° C. of at least 7.0 N/25 mm; a hot tack initiation at 1 N of less than 85° C.; a hot tack strength at 110° C. of at least 2.00 N/25 mm; and zero percent (0%) shrinkage at temperatures in the range of from 70° C. to 120° C.

Articles

Embodiments of the present invention also provide articles formed from any of the inventive laminates described herein. Examples of such articles can include packages, flexible packages, pouches, and sachets. In some embodiments, packages of the present invention can comprise a liquid, a powder, a food product, or other items. Articles and packages of the present invention can be formed from the laminate disclosed herein using techniques known to those of skill in the art in view of the teachings herein.

Method of Manufacturing the Laminate

Laminates of the present invention can be manufactured by methods known to those skilled in the art based on the teachings disclosed herein. For example, a method for manufacturing the laminate, as disclosed herein, can comprise: (a) providing a first film comprising at least 95 wt. % polyethylene; (b) providing a second film comprising (i) a lamination layer comprising an ethylene copolymer selected from the group consisting of an ethylene/vinyl acetate copolymer, ethylene/acrylic acid copolymer, ethylene/acrylate copolymer, anhydride-modified ethylene/acrylate copolymer, anhydride-modified polyethylene, anhydride-modified ethylene/vinyl acetate copolymer, polyethylene elastomer/plastomer, and combinations thereof; (ii) a sealant layer, wherein the sealant layer comprises at least 70 wt. % of a polymer having a highest peak melting temperature ($T_m$) of 108° C. or less; (iii) a barrier layer comprising an ethylene vinyl alcohol copolymer; (iv) a first tie layer between the lamination layer and the barrier layer; and (v) a second tie layer between the barrier layer and the sealant layer; and (c) extruding a web layer comprising a polymer between the first film and the lamination layer of the second film, the polymer comprising at least one of an ethylene/methyl acrylate copolymer, ethylene/butyl acrylate copolymer, ethylene/ethyl acrylate copolymer, ethylene/vinyl trimethoxy silane copolymer, ethylene/vinyl acetate copolymer, ethylene/acrylic acid copolymer, ethylene/methacrylic acid copolymer, maleic anhydride-modified polyethylene, ethylene-acid terpolymer, or ethylene/methacrylic acid/acrylate terpolymer; and (d) passing the first film and the second film with the extruded web layer in between a pair of rollers to form a laminate.

In embodiments where the method of manufacturing the laminate comprises the step of passing the first film and the second film with the extruded web layer in between a pair of rollers to form a laminate, the pair of rollers to form the laminate can include heated pressure rollers and/or embossing rollers.

Test Methods

Density

Density is measured in accordance with ASTM D792, and expressed in grams/cm$^3$ (g/cm$^3$).

Melt Index (I$_2$)

Melt index (I$_2$) is measured in accordance with ASTM D-1238 at 190° C. at 2.16 kg. The values are reported in g/10 min, which corresponds to grams eluted per 10 minutes.

Oxygen Transmission Rate (OTR)

Oxygen transmission rate (OTR) is measured in accordance with ASTM D3985 using a Mocon Ox-Tran 2/21. Samples are tested at 23° C., 100% O$_2$ gas dry, 0% RH, 50 cm$^2$ sample size. The values are reported in cm$^3$/day/m$^2$.

Water Vapor Transmission Rate (WVTR)

Water Vapor Transmission Rate (WVTR) is measured in accordance with ASTM F1249 using Mocon Permatran-W 3/34 & 3/60. Samples are tested at 37.8° C., 100% RH, 50 cm$^2$ sample size. The values are reported in g/day/m$^2$.

Hot Tack Initiation and Hot Tack Strength

A hot tack test is performed using a J&B hot tack tester 4000 at sealing width of 25 mm, dwell seal time of 0.5 s, sealing pressure of 0.275 N/mm$^2$ (40 psi), and hot tack pull speed of 200 mm/s. Hot tack initiation is reported as the minimum temperature in degrees Celsius to reach 1 Newton force. Hot tack strength is measured in unit of Newton per 25 mm (N/25 mm).

Heat Seal Initiation Temperature and Seal Strength

To determine heat seal initiation temperature (HSIT) and seal strength, samples are sealed by a J&B Hot Tack 4000

Tester. The sample width is 25 mm, the dwell seal time is 0.5 seconds, and the seal pressure is 0.275 N/mm². Heat sealed samples are conditioned for 24 hours and then measured using a Zwick tensile machine, equipped with a 200 N load cell, and at a pulling speed of 500 mm/min. HSIT is reported as a minimum temperature in degrees Celsius to reach 5 Newton force. Seal Strength values are reported in N/25 mm.

Shrinkage

Shrinkage (%) is obtained by measuring the length and width of the seal area in both machine direction (MD) and cross or transverse direction (TD) after heat sealing the films together and calculating the percentage of change compared to the seal bar width, which can be between 1 mm to 15 mm. Standard heat sealing machines, including PULSA impulse sealer or J&B Hot Tack tester, can be used, provided the machines have an accurate and adjustable temperature controller. Sealing conditions include jaw pressure (40-80 psi or 0.275-0.552 N/mm²), dwell time (0.1-1.5 seconds), and seal temperature (60-150° C.) window and depend on packaging speed, where typical conditions for fast speed packaging machines are 40 psi (0.275 N/mm²) jaw pressure and 0.5 seconds dwell time.

Bond Strength

Bond strength is measured using a Zwick tensile tester at a pulling speed of 250 mm/min and with 25 mm width strips. The tensile tester is equipped with a gripper fixture (sample held in a T-shape) to hold two ends of a partially delaminated or partially peeled sample before being pulled apart. The upper gripper that is connected to the crosshead is driven in the tensile direction to measure the force required or bond strength between two adjacent layers of the multilayer sample. Maximum force and average force results are calculated from 5 measurements and recorded in Newtons (N/25 mm strips) units.

Highest Peak Melting Temperature ($T_m$)

Differential Scanning Calorimetry (DSC) is used to measure the melting and crystallization behavior of a polymer over a wide range of temperatures. For example, the TA Instruments Q1000 DSC, equipped with an RCS (refrigerated cooling system) and an autosampler is used to perform this analysis. The instrument is first calibrated using the software calibration wizard. A baseline is obtained by heating a cell from −80° C. to 280° C. without any sample in an aluminum DSC pan. Sapphire standards are then used as instructed by the calibration wizard. Next, 1 to 2 milligrams (mg) of a fresh indium sample are analyzed by heating the standards sample to 180° C., cooling to 120° C. at a cooling rate of 10° C./minute, and then keeping the standards sample isothermally at 120° C. for 1 minute. The standards sample is then heated from 120° C. to 180° C. at a heating rate of 10° C./minute. Then, it is determined that indium standards sample has heat of fusion ($H_f$)=28.71±0.50 Joules per gram (J/g) and onset of melting=156.6° C.±0.5° C. Test samples are then analyzed on the DSC instrument.

During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are highest peak melting temperature ($T_m$), highest peak crystallization temperature ($T_c$), onset crystallization temperature (Tc onset), heat of fusion ($H_f$) (in Joules per gram), and the calculated % crystallinity for polyethylene samples using: % Crystallinity for PE=((Hf)/(292 J/g))×100, and the calculated % crystallinity for polypropylene samples using: % Crystallinity for PP=((Hf)/165 J/g))×100. The heat of fusion ($H_f$) and the highest peak melting temperature are reported from the second heat curve. Highest peak crystallization temperature and onset crystallization temperature are determined from the cooling curve.

Some embodiments of the present invention will now be described in detail in the following Examples.

Examples

Materials and Films Used

The following materials were included in the example laminates discussed below.

ELITE™ 5960G1, an enhanced polyethylene resin having a density of 0.962 g/cm³ and melt index ($I_2$) of 0.85 g/10 min and commercially available from The Dow Chemical Company (Midland, MI).

DOW™ LDPE 450E, a low density polyethylene resin having a density of 0.923 g/cm³ and melt index ($I_2$) of 2.0 g/10 min and commercially available from The Dow Chemical Company (Midland, MI).

BYNEL™ 22E780, an ethylene/acrylate copolymer resin having a density of 0.94 g/cm³ and melt index ($I_2$) of 2 g/10 min and commercially available from The Dow Chemical Company (Midland, MI).

ELVAX™ 3180 ("ELVAX"), an ethylene/vinyl acetate copolymer having a highest peak melting temperature ($T_m$) of 70° C., a density of 0.95 g/cm³, and melt index ($I_2$) of 25 g/10 min and commercially available from The Dow Chemical Company (Midland, MI).

BYNEL™ 41E710, an anhydride-modified linear low density polyethylene resin having a density of 0.922 g/cm³ and melt index ($I_2$) of 2.7 g/10 min, and commercially available from The Dow Chemical Company (Midland, MI).

EVAL H171B, a 38 mol % ethylene vinyl alcohol copolymer having a density of 1.17 g/cm³ and melt index ($I_2$) of 1.7 g/10 min, and commercially available from Kuraray Co., Ltd. (Tokyo, Japan).

SURLYN™ 1707, an ionomer of ethylene acid copolymer neutralized with a sodium cation source, having a highest peak melting temperature ($T_m$) of 92° C., a density of 0.95 g/cm³ and melt index ($I_2$) of 0.9 g/10 min, and commercially available from The Dow Chemical Company (Midland, MI).

AFFINITY™ PF 7266, a polyethylene elastomer/plastomer having a highest peak melting temperature ($T_m$) of 76° C., a density of 0.885 g/cm³ and melt index ($I_2$) of 2.5 g/10 min, and commercially available from The Dow Chemical Company (Midland, MI).

NUCREL™ N0427HS ("NUCREL"), an ethylene/meth-acrylic acid/acrylate terpolymer having a density of 0.94 g/cm³ and melt index (I₂) of 27 g/10 min, and commercially available from The Dow Chemical Company (Midland, MI).

ELVALOY™ AC12024S ("ELVALOY"), an ethylene/ methyl acrylate copolymer having a highest peak melting temperature ($T_m$) of 88° C., a density of 0.944 g/cm³ and melt index (I₂) of 20 g/10 min, and commercially available from The Dow Chemical Company (Midland, MI).

AFFINITY™ PL 1881G, a polyethylene elastomer/plastomer having a highest peak melting temperature ($T_m$) of 100° C., a density of 0.904 g/cm³ and melt index (I₂) of 1.0 g/10 min, and commercially available from The Dow Chemical Company (Midland, MI).

POLYBATCH CE505, a slip masterbatch commercially available from Lyondell Basell (Houston, TX).

POLYBATCH AB5, an antiblock masterbatch commercially available from Lyondell Basell (Houston, TX).

CONPOL™ 13B, an antiblock masterbatch commercially available from The Dow Chemical Company (Midland, MI).

CONPOL™ 20S1, a slip masterbatch commercially available from The Dow Chemical Company (Midland, MI).

ADCOTE™ 545S/Co-reactant F854, a solvent based 2-component polyurethane adhesive commercially available from The Dow Chemical Company (Midland, MI).

BOPP Substrate ("BOPP"), a printed biaxially oriented propylene film treated at 36 dynes and having an 18 micron gauge with 2 micron thickness for printing.

PE Substrate ("PE"), a multilayer, five layer film having 25 microns thickness and layer structure of (1) 100% ELITE™ 5960G1; (2) 100% ELITE™ 5960G1; (3) 100% ELITE™ 5960G1; (4) 100% ELITE™ 5960G1; (5) 100% DOW™ LDPE 450E, with (1) ELITE™ 5960G1 directed towards the outer side of the laminate. The film is formed on a Collin 5-layer cast co-extrusion line with 4 extruders, Configuration: A/B/C/B/D; Layer Ratio: 1/1/1/1/1; melt temperature of each extruder of 250-260° C.; slot die by coat hanger geometry; total throughput of 8 kg/hr; line speed of 21.5 m/min.

Laminates, designated as Inventive Examples 1-6 and Comparative Examples 1-6, are formed in a construction of "PRINT-WEB-A-B-C-B-D." "PRINT" corresponds to the PE Substrate (first film) for Inventive Examples and BOPP Substrate for Comparative Examples. "A-B-C-B-D" corresponds to a five layer multilayer film (second film), where "A" is a laminating layer, "B" is tie layers, "C" is a barrier layer, and "D" is a sealant layer. The "A-B-C-B-D" five layer multilayer film is formed on a Collin 5-layer blown co-extrusion line with the following parameters—Target film thickness: 55 microns; Extruders: 4 extruders; Layer configuration: A-B-C-B-D; Additives: Layer A=5000 ppm anti-block and Layer D=5000 ppm slip and 5000 ppm anti-block; Layer Ratio: 18.2%/13.65%/18.2%/13.65%/ 36.4%; BUR: 3.0; Layer Thickness (μm): 10/7.5/10/7.5/20; and Layflat Width (mm): 235. "WEB" corresponds to the extruded web layer where a polymer extrudate is extruded via extrusion lamination between the "PRINT" and "A-B-C-B-D" films. For the extrusion lamination process, the films are corona treated to around 40-42 dynes with Corona power of 2 KW. The start-up extruder conditions for the extruded web layer are set as follows: Extruder temperature: 120/140/170/170° C.; Joint/Adaptor: 170/170° C.; Die: 170° C. The final processing extrusion lamination conditions are as follows: melt temperature of 200° C. with screw speed of 16 rpm, line speed of 6 m/min, and air gap of 100 mm. The target extruded web layer thickness is 20 micron (or 20 gsm). The extruded web layer is extruded between the "PRINT" and "A-B-C-B-D" films and the resulting structure is passed through a pair of rollers to form laminates.

Comparative Examples 7 and 8 are not formed via extrusion lamination with an extruded web layer, but instead are formed via hot roll lamination with a laminating adhesive. For these examples, the "PRINT" substrate is laminated to the layer "A" of the multilayer film using ADCOTE™ 545S/Co-reactant F854 applied at a coating weight of 3-3.5 gsm. Examples are cured at room temperature (25° C.) for two days and a hot roll lamination process is performed on ChemInstruments #007416 at a temperature of 75° C., pressure of 60 psi, and speed of 1.66 m/min.

Table 1 below provides the structure and composition of the laminate examples, Inventive Examples 1-6 and Comparative Examples 1-8.

TABLE 1

Laminate Structure and Composition

| Ex. | Print | Web | Layer A | Layer B | Layer C | Layer B | Layer D |
|---|---|---|---|---|---|---|---|
| Comp. 1 | BOPP | NUCREL | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 80% AFFINITY ™ PF 7266** |
| Comp. 2 | BOPP | NUCREL | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 93.5% SURLYN ™ 1707*** |
| Inv. 1 | PE | NUCREL | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 80% AFFINITY ™ PF 7266** |
| Inv. 2 | PE | NUCREL | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 93.5% SURLYN ™ 1707*** |
| Comp. 3 | BOPP | ELVALOY | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 80% AFFINITY ™ PF 7266** |
| Comp. 4 | BOPP | ELVALOY | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 93.5% SURLYN ™ 1707*** |
| Inv. 3 | PE | ELVALOY | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 80% AFFINITY ™ PF 7266** |
| Inv. 4 | PE | ELVALOY | 96% BYNEL ™ 22E780* | 50% BYNEL ™ 41E710 + 50% ELITE ™ 5960G1 | EVAL H171B | 50% BYNEL ™ 41E710 + 50% ELITE ™ 5960G1 | 93.5% SURLYN ™ 1707*** |

TABLE 1-continued

Laminate Structure and Composition

| Ex. | Print | Web | Layer A | Layer B | Layer C | Layer B | Layer D |
|---|---|---|---|---|---|---|---|
| Comp. 5 | BOPP | ELVAX | 96% BYNEL™ 22E780* | 50% BYNEL™ 41E710 + 50% ELITE™ 5960G1 | EVAL H171B | 50% BYNEL™ 41E710 + 50% ELITE™ 5960G1 | 80% AFFINITY™ PF 7266** |
| Comp. 6 | BOPP | ELVAX | 96% BYNEL™ 22E780* | 50% BYNEL™ 41E710 + 50% ELITE™ 5960G1 | EVAL H171B | 50% BYNEL™ 41E710 + 50% ELITE™ 5960G1 | 93.5% SURLYN™ 1707*** |
| Inv. 5 | PE | ELVAX | 96% BYNEL™ 22E780* | 50% BYNEL™ 41E710 + 50% ELITE™ 5960G1 | EVAL H171B | 50% BYNEL™ 41E710 + 50% ELITE™ 5960G1 | 80% AFFINITY™ PF 7266** |
| Inv. 6 | PE | ELVAX | 96% BYNEL™ 22E780* | 50% BYNEL™ 41E710 + 50% ELITE™ 5960G1 | EVAL H171B | 50% BYNEL™ 41E710 + 50% ELITE™ 5960G1 | 93.5% SURLYN™ 1707*** |
| Comp. 7 | BOPP | N/A (ADCOTE) | LDPE 450E | 50% BYNEL™ 41E710 + 50% ELITE™ 5960G1 | EVAL H171B | 50% BYNEL™ 41E710 + 50% ELITE™ 5960G1 | 80% AFFINITY™ PF 7266** |
| Comp. 8 | BOPP | N/A (ADCOTE) | LDPE 450E | 50% BYNEL™ 41E710 + 50% ELITE™ 5960G1 | EVAL H171B | 50% BYNEL™ 41E710 + 50% ELITE™ 5960G1 | 93.5% SURLYN™ 1707*** |

*In addition to 96% BYNEL ™ 22E780, Layer A includes 4% CONPOL ™ 13B.
**In addition to 80% AFFINITY ™PF 7266, Layer D includes 10% POLYBATCH ® CE505 and 10% POLYBATCH ® AB5.
***In addition to 93.5% SURLYN ™ 1707, Layer D includes 4% CONPOL ™ 13B and 2.5% CONPOL ™ 20S1.

The laminate thickness, oxygen transmission rate (OTR), water vapor transmission rate (WVTR), and bond strength of the examples are measured. Table 2 provides the results. The Inventive Examples maintain OTR and WVTR values with generally comparable or higher bond strength to the Comparative Examples, which are not compatible with polyethylene recycling streams. Also, a person of ordinary skill in the art will appreciate that the OTR of the laminate can be adjusted depending on the thickness and ethylene content of the EVOH of the barrier layer (i.e., in general, the thicker the barrier layer or the lower the ethylene content, the lower the achievable OTR value is).

TABLE 2

Thickness, Bond Strength, OTR, and WVTR

| Ex. | Thickness (μm) | Bond Strength Print to Web (N/25 mm) | Bond Strength A-B-C-B-D to Web (N/25 mm) | OTR (cm³/day/m²) | WVTR (g/day/m²) |
|---|---|---|---|---|---|
| Comp. 1 | 95 | 1.33 | 5.35 | 13.48 | 2.98 |
| Comp. 2 | 95 | 3.72 | 8.72 | 11.17 | 1.20 |
| Inv. 1 | 100 | 8.54 | 12.96 | 2.85 | 5.10 |
| Inv. 2 | 100 | 7.48 | 12.48 | 1.98 | 3.64 |
| Comp. 3 | 95 | 0.87 | 4.36 | 2.44 | 2.87 |
| Comp. 4 | 95 | 2.11 | 4.03 | 1.80 | 1.12 |
| Inv. 3 | 100 | 4.16 | 5.07 | 2.08 | 3.39 |
| Inv. 4 | 100 | 0.90 | 4.54 | 1.94 | 1.30 |
| Comp. 5 | 95 | 0.84 | 6.91 | 2.70 | 2.92 |
| Comp. 6 | 95 | 1.35 | 4.78 | 2.66 | 2.72 |
| Inv. 5 | 100 | 5.71 | 6.27 | 1.98 | 5.38 |
| Inv. 6 | 100 | 5.83 | 7.62 | 2.33 | 3.93 |
| Comp. 7 | 73 | 1.99* | * | 2.68 | 2.85 |
| Comp. 8 | 73 | 1.64* | * | 1.82 | 2.49 |

*The BOPP Film for Comparative Examples is a printed BOPP with the printed ink side laminated to the five-layer film using solvent-based laminating adhesive and so bond strength is measured according to the printed ink side of the BOPP to the five-layer film.

Figure 2:
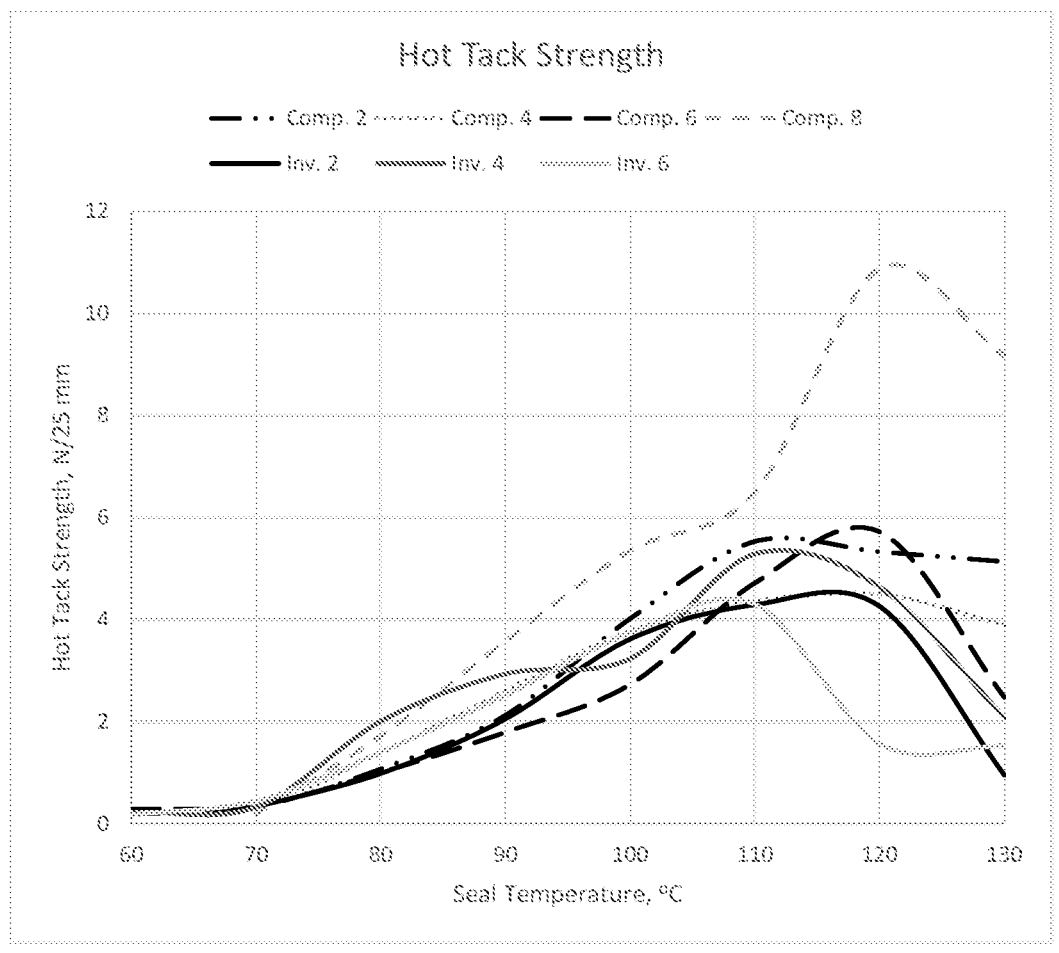
FIG. 2 is a hot tack strength graph of Comparative and Inventive Examples discussed below.

The heat seal initiation temperature (HSIT), heat seal strength, hot tack initiation temperature at 1 Newton, and hot tack strength are measured. FIG. 1 shows the heat seal strength curves of Comparative Examples 1, 3, 5, and 7, and Inventive Examples 1, 3, and 5. FIG. 2 shows the hot tack strength curves of Comparative Examples 2, 4, 6, and 8, and Inventive Examples 2, 4, and 6. Table 3 provides results for Comparative Examples and Inventive Examples, where AFFINITY™ PF 7266 is part of the sealant layer/Layer D. Table 4 provides results for Comparative Examples and Inventive Examples, where SURLYN™ 1707 is part of the sealant layer/Layer D. From Tables 3 and 4, the Inventive Examples show a desirable or maintained low hot tack initiation temperature and low HSIT. The Inventive Examples also achieve in aspects desirable, maintained, or improved seal strength performance.

TABLE 3

HSIT, Seal Strength, Hot Tack Initiation, and Hot Tack Strength for Comparative Example 1, 3, 5, and 7, and Inventive Examples 1, 3, and 5.

| Ex. | HSIT @ 5N (° C.) | Seal Strength @ 120° C. (N/25 mm) | Hot Tack Initiation @ 1N (° C.) | Hot Tack Strength @ 110° C. (N/25 mm) |
|---|---|---|---|---|
| Comp. 1 | 67 | 42.7 | 75 | 2.6 |
| Comp. 3 | 74 | 41.1 | 72 | 2.7 |
| Comp. 5 | 72 | 42.1 | 76 | 2.8 |
| Comp. 7 | 74 | 47.9 | 78 | 1.51 |
| Inv. 1 | 74 | 39.2 | 65 | 2.2 |
| Inv. 3 | 73 | 49.9 | 75 | 2.6 |
| Inv. 5 | 72 | 49.9 | 70 | 2.3 |

TABLE 4

HSIT, Seal Strength, Hot Tack Initiation, and Hot Tack Strength for Comparative Example 2, 4, 6, and 8, and Inventive Examples 2, 4, and 6.

| Ex. | HSIT @ 5N (° C.) | Seal Strength @ 120° C. (N/25 mm) | Hot Tack Initiation @ 1N (° C.) | Hot Tack Strength @ 110° C. (N/25 mm) |
|---|---|---|---|---|
| Comp. 2 | 102 | 10.9 | 80 | 5.5 |
| Comp. 4 | 115 | 6.4 | 77 | 4.4 |
| Comp. 6 | 114 | 7.7 | 80 | 4.7 |
| Comp. 8 | 97 | 12.2 | 75 | 6.43 |

TABLE 4-continued

HSIT, Seal Strength, Hot Tack Initiation, and
Hot Tack Strength for Comparative Example 2,
4, 6, and 8, and Inventive Examples 2, 4, and 6.

| Ex. | HSIT @ 5N (° C.) | Seal Strength @ 120° C. (N/25 mm) | Hot Tack Initiation @ 1N (° C.) | Hot Tack Strength @ 110° C. (N/25 mm) |
|---|---|---|---|---|
| Inv. 2 | 106 | 10.8 | 80 | 4.3 |
| Inv. 4 | NM* | NM* | 74 | 5.3 |
| Inv. 6 | 103 | 8.7 | 75 | 4.3 |

*Not measured.

The shrinkage (%) of the heat sealed area at 70° C., 80° C., 90° C., 100° C., 110° C., 120° C., and 130° C. of the examples is measured. None of the examples show shrinkage at 70° C., 80° C., 90° C., 100° C., 110° C. or 120° C. in the machine direction (MD) or cross or transverse direction (TD). The results of shrinkage (%) for the examples are reported in Table 5. Although some of the Inventive Examples show shrinkage at 130° C. as compared to Comparative Examples, the Inventive Examples can perform equivalent or similar to the Comparative Examples in temperature ranges of approximately 70° C.-120° C., which offers a broad heat sealing window of at least 50° C.

TABLE 5

Shrinkage Values for Inventive and Comparative Examples

| Example | Shrinkage (%) in MD @ 70-120° C.* | Shrinkage (%) in TD @ 70-120° C.* | Shrinkage (%) in MD @ 130° C.* | Shrinkage (%) in TD @ 130° C.* |
|---|---|---|---|---|
| Comp. 1 | 0 | 0 | 0 | 0 |
| Comp. 2 | 0 | 0 | 0 | 0 |
| Comp. 3 | 0 | 0 | 0 | 0 |
| Comp. 4 | 0 | 0 | 0 | 0 |
| Comp. 5 | 0 | 0 | 0 | 0 |
| Comp. 6 | 0 | 0 | 0 | 0 |
| Comp. 7 | 0 | 0 | 0 | 0 |
| Comp. 8 | 0 | 0 | 0 | 0 |
| Inv. 1 | 0 | 0 | 0 | 5 |
| Inv. 2 | 0 | 0 | 0 | 5 |
| Inv. 3 | 0 | 0 | 0 | 5 |
| Inv. 4 | 0 | 0 | 0 | 5 |
| Inv. 5 | 0 | 0 | 0 | 5 |
| Inv. 6 | 0 | 0 | 0 | 5 |

*Seal bar dimensions: 0.5 cm (MD direction) × 2.5 cm (TD direction).

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A laminate comprising:
(a) a first film comprising at least 95 wt. % polyethylene;
(b) a second film comprising:
(i) a lamination layer comprising an ethylene copolymer selected from the group consisting of an ethylene/vinyl acetate copolymer, ethylene/acrylic acid copolymer, ethylene/acrylate copolymer, anhydride-modified ethylene/acrylate copolymer, anhydride-modified polyethylene, anhydride-modified ethylene/vinyl acetate copolymer, polyethylene elastomer/plastomer, and combinations thereof;
(ii) a sealant layer, wherein the sealant layer comprises at least 70 wt. % of a polymer having a highest peak melting temperature ($T_m$) of 102° C. or less and wherein the polymer is an ionomer of ethylene acid copolymer, or a polyethylene elastomer/plastomer;
(iii) a barrier layer comprising an ethylene vinyl alcohol copolymer;
(iv) a first tie layer between the lamination layer and the barrier layer; and
(v) a second tie layer between the barrier layer and the sealant layer; and
(c) an extruded web layer adhering the lamination layer of the second film to the first film, the extruded web layer comprising at least one of an ethylene/methyl acrylate copolymer, ethylene/butyl acrylate copolymer, ethylene/ethyl acrylate copolymer, ethylene/vinyl trimethoxy silane copolymer, ethylene/vinyl acetate copolymer, ethylene/acrylic acid copolymer, ethylene/methacrylic acid copolymer, maleic anhydride-modified polyethylene, ethylene-acid terpolymer, or ethylene/methacrylic acid/acrylate terpolymer.

2. The laminate of claim 1, wherein each of the first tie layer and the second tie layer comprises at least one of an anhydride-modified linear low density polyethylene, a linear low density polyethylene, low density polyethylene, medium density polyethylene, or high density polyethylene.

3. The laminate of claim 1, wherein the extruded web layer comprises at least one of an ethylene/methyl acrylate copolymer, ethylene/methacrylic acid/acrylate terpolymer, or ethylene/vinyl acetate copolymer.

4. The laminate of claim 1, wherein the lamination layer further comprises at least one of a linear low density polyethylene, medium density polyethylene, or high density polyethylene.

5. The laminate of claim 1, wherein the polymer in the sealant layer has a highest peak melting temperature ($T_m$) of 100° C. or less.

6. The laminate of claim 1, wherein the ethylene copolymer of the lamination layer is an ethylene/acrylate copolymer.

7. The laminate of claim 1, wherein the first film is a machine direction oriented film.

8. The laminate of any one of claim 1, wherein the first film is a biaxially oriented film.

9. The laminate of claim 1, wherein the laminate has a thickness between 50 and 150 microns.

10. The laminate of claim 1, wherein the laminate is free of a laminating adhesive.

11. The laminate of claim 1, wherein the sealant layer comprises at least 80 wt. % of the polymer having a highest peak melting temperature ($T_m$) of 102° C. or less.

12. The laminate of claim 1, wherein the sealant layer consists of at least one of an ionomer of ethylene acid copolymer or a polyethylene elastomer/plastomer, and optionally at least one additive selected from the group of antioxidants, ultraviolet light stabilizers, thermal stabilizers, slip agents, antiblock agent, antistatic agents, pigments or colorants, processing aids, crosslinking catalysts, flame retardants, fillers, foaming agents, or combinations thereof.

\* \* \* \* \*